(12) United States Patent
Nogiwa

(10) Patent No.: US 6,524,059 B1
(45) Date of Patent: Feb. 25, 2003

(54) TURBO FLUID MACHINERY AND DRY GAS SEAL USED FOR THE MACHINERY

(75) Inventor: Hideto Nogiwa, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/508,248

(22) PCT Filed: Jul. 23, 1999

(86) PCT No.: PCT/JP99/03959

§ 371 (c)(1),
(2), (4) Date: Mar. 9, 2000

(87) PCT Pub. No.: WO01/07791

PCT Pub. Date: Feb. 1, 2001

(51) Int. Cl.[7] .............................................. F01D 17/00
(52) U.S. Cl. ......................... 415/26; 415/112; 415/113; 415/175
(58) Field of Search .......................... 415/26, 111, 112, 415/113, 175, 230, 231; 277/361, 408

(56) References Cited

U.S. PATENT DOCUMENTS 3,632,923 A * 1/1972 Paine et al. ............. 200/81.9 M
4,993,917 A * 2/1991 Kulle et al. ................. 277/361
5,412,977 A * 5/1995 Schmohl et al. ............ 277/318

FOREIGN PATENT DOCUMENTS

| JP | 48-74616 | 10/1973 |
|----|----------|---------|
| JP | 4-29678 | 1/1992 |
| JP | 4-187897 | 7/1992 |
| JP | 4-228975 | 8/1992 |
| JP | 4-236867 | 8/1992 |
| JP | 5-310446 | 11/1993 |
| JP | 6-174106 | 6/1994 |
| JP | 7-208330 | 8/1995 |

* cited by examiner

*Primary Examiner*—Edward K. Look
*Assistant Examiner*—Dwayne J. White
(74) *Attorney, Agent, or Firm*—Antonelli, Terry, Stout & Kraus, LLP

(57) ABSTRACT

With a turbo type fluid machine provided with a primary dry gas seal (9) and a secondary dry gas seal (10), abnormality in an amount of a working gas leaked from between a rotating ring (7a, 7b) adapted to rotate with a rotor (4) and a stationary ring (8a, 8b) is detected by a pressure switch (14) and a flow meter (15), which are provided in a primary seal vent line (12), and meanwhile, the working gas leaking from sealing surfaces (17) of a labyrinth seal (16) and the secondary dry gas seal, together with a purge gas purged to a space (18) from outside is discharged outside the machine from a flow passage (34) via a space (33) when abnormality generates in the secondary dry gas seal, a control valve (19) provided in the purge gas line operates to secure a flow rate in the purge gas line, so that a flow rate detected by the flow meter provided in the purge gas line increases, and thus abnormality in the secondary dry gas seal is detected.

9 Claims, 3 Drawing Sheets

US 6,524,059 B1

TURBO FLUID MACHINERY AND DRY GAS SEAL USED FOR THE MACHINERY

TECHNICAL FIELD

The present invention relates to a turbo type fluid machine, and more particularly to detection of abnormality in a turbo type fluid machine provided with a dry gas seal.

BACKGROUND ART

In a turbo type fluid machine such as a multi-stage centrifugal compressor, in which a plurality of centrifugal impellers or semi-axial flow impellers are mounted to the same shaft, use of dry gas seals has been rapidly spreading in recent years in order to prevent a working gas from leaking into a lubricating oil used for bearings and from flowing outside the fluid machine. The dry gas seal normally comprises a primary dry gas seal for preventing the working gas from leaking to a side of bearings disposed in the atmosphere side from an inside of the compressor, and a secondary dry gas seal for serving as a backup when the primary dry gas seal is damaged and for preventing the working gas, which leaks from the primary dry gas seal, from leaking to the side of the bearings. Then, the state of the primary dry gas seal is monitored by checking the leaking of the working gas from the primary dry gas seal.

Concretely, there is provided a pipe, through which the working gas leaking from the primary dry gas seal is communicated with a space formed between the primary dry gas seal and the secondary dry gas seal, and the working gas is conducted to outside through the pipe. Such line is called as a primary dry gas seal vent line. An orifice is provided in the primary dry gas seal vent line to find pressure and a flow rate of the working gas, which flows through the primary dry gas seal vent line, from pressures before and after the orifice, whereby a flow rate of leakage is monitored.

Japanese Patent Unexamined Publication Nos. 4-29678 and 4-187897 describe examples of a system, which provides a primary dry gas seal vent line in a multi-stage centrifugal compressor in the above-mentioned manner to monitor an amount of a working gas leaking from the primary dry gas seal vent line. Further, Japanese Patent Unexamined Publication No. 7-208330 describes the provision of a primary gas seal and a secondary gas seal to prevent a working gas from leaking out of a machine or into a lubricating oil. Further, Japanese Patent Unexamined Publication Nos. 4-228975 and 6-174106 describe the provision of a pressure control valve and a flow meter in a seal gas supply flow passage in a screw compressor, in which dry gas seals are used, to issue an alarm when a gas flow rate becomes equal to or more than a predetermined value.

Since a primary dry gas seal constituting a dry gas seal effectively functions in normal operation, it is less possible that a secondary dry gas seal is directly acted by a pressure of a working gas. Therefore, an amount of leakage through the secondary dry gas seal is markedly less than that through a primary dry gas seal. In order to detect the small amount of leakage, it has been proposed to provide a flow amount meter such as an orifice or the like in the secondary dry gas seal vent line, by which the working gas leaking from the secondary dry gas seal is conducted outside the machine in the same manner as that for the primary dry gas seal. However, since the amount of leakage itself is small, measurement is actually difficult due to the need of extremely throttling an orifice used as the flow rate measuring means, and to the necessity of an expensive equipment capable of measurement with high accuracy in the case of a small amount of leakage even when a flow meter such as an electromagnetic flow meter is employed.

Further, if an orifice and a flow meter are provided in the secondary vent line, the working gas does not flow to the second vent line of a great flow-channel resistance but flows to a side of bearings disposed outside the secondary dry gas seal in the worst circumstances, in which both the primary dry gas seal and the secondary dry gas seal are broken. As a result, there is caused a risk of the working gas flowing into an oil return system of the lubricating oil in large quantities. In the case where the working gas is a combustible gas or include a poisonous component, flow of the working gas into the oil return system causes a risk of a serious accident generating. Accordingly, it is not desirable to provide in the secondary vent line a means, such as an orifice, a flow meter and the like, for presenting a channel-resistance. As mentioned above, since it is not desirable to provide a channel-resistance in the secondary vent line, direct monitoring of an amount of leakage from the secondary dry gas seal has been conventionally given up.

Hereupon, the secondary dry gas seal serves to prevent the working gas from leaking from the primary dry gas seal to the bearings and to serve as a backup when the primary dry gas seal is damaged, so that it is strongly demanded to correctly grasp the operating condition of the secondary dry gas seal with a view to increasing reliability for a turbo type fluid machine. With the respective prior art mentioned above, an adequate effect has been obtained with respect to securing of reliability and reduced cost of a dry seal, while an insufficient attention has been paid to correctly grasping an amount of leakage from the secondary dry gas seal for the reason mentioned above.

The invention has been devised in view of the disadvantages of the prior arts mentioned above, and has its object to improve reliability on a turbo type fluid machine. Another object of the invention is to improve reliability on a dry gas seal used in a turbo type fluid machine. A still further object of the invention is to provide a dry gas seal improved in reliability and having a simple structure.

DISCLOSURE OF THE INVENTION

To achieve the objects mentioned above, in a first aspect of the invention, there is provided a turbo type fluid machine provided with a sealing device composed of a primary dry gas seal and a secondary dry gas seal, the improvement wherein presence of abnormality on the secondary dry gas seal can be detected in accordance with an amount of a working gas leaking from the secondary dry gas seal. Preferably, the machine further comprises a flow rate switch for detecting an quantity of the working gas from said secondary dry gas seal is provided; and further comprises means for supplying a purge gas to said secondary dry gas seal, and pressure control means capable of controlling the purge gas supplied from the supply means to make the same substantially constant in pressure in the secondary dry gas seal.

To achieve the objects mentioned above, in a second aspect of the invention, there is provided a turbo type fluid machine provided with a rotor, bearings, which rotatably support the rotor and are arranged in the vicinity of both ends of the rotor, a casing, which receives therein the rotor and the bearings, and two sealing devices arranged inwardly of the bearings in an axial direction of the rotor, the sealing devices comprising a first fixed ring and a second fixed ring, which are fixed to said rotor, a first stationary ring opposed to the first fixed ring and fixed to the casing, a second stationary ring opposed to the second fixed ring and fixed to the casing, and a purge gas supply line, through which a purge gas is fed to opposing portions of the second fixed ring and the second stationary ring, the purge gas supply line being provided with abnormal flow-rate detecting means.

More preferably, the abnormal flow-rate detecting means is a flow rate switch; the machine further comprises control means provided in the purge gas supply line for controlling pressure of a gas flowing in the purge gas supply line; the pressure control means includes a control valve and a pressure transmitter provided downstream of the control valve; the pressure control means includes a control valve with a diaphragm; the machine further comprises a primary seal vent line provided on back sides of the first rotating ring and the first stationary ring for conducting a gas, which leaks from the first rotating ring and the first stationary ring, to outside the machine; and the machine further comprises an orifice, a pressure switch and a flow rate meter, which are provided in the primary seal vent line.

To achieve the objects mentioned above, in a third aspect of the invention, there is provided a dry gas seal device for sealing a working gas compressed in a turbo type fluid machine, comprising a primary dry gas seal and a secondary dry gas seal, the secondary dry gas seal including abnormality detecting means for detecting abnormality in accordance with an amount of the working gas leaking from the first dry gas seal. Preferably, the abnormality detecting means comprises purge gas supply means for supplying the purge gas to the secondary dry gas seal, pressure control means for controlling pressure in the purge gas supply means, and a flow rate switch for detecting abnormality in flow rate within the purge gas supply means.

BEST MODE FOR CARRYING OUT THE INVENTION

Hereinafter, an embodiment in accordance with the invention will be described with reference to the drawings.

Figure 1:
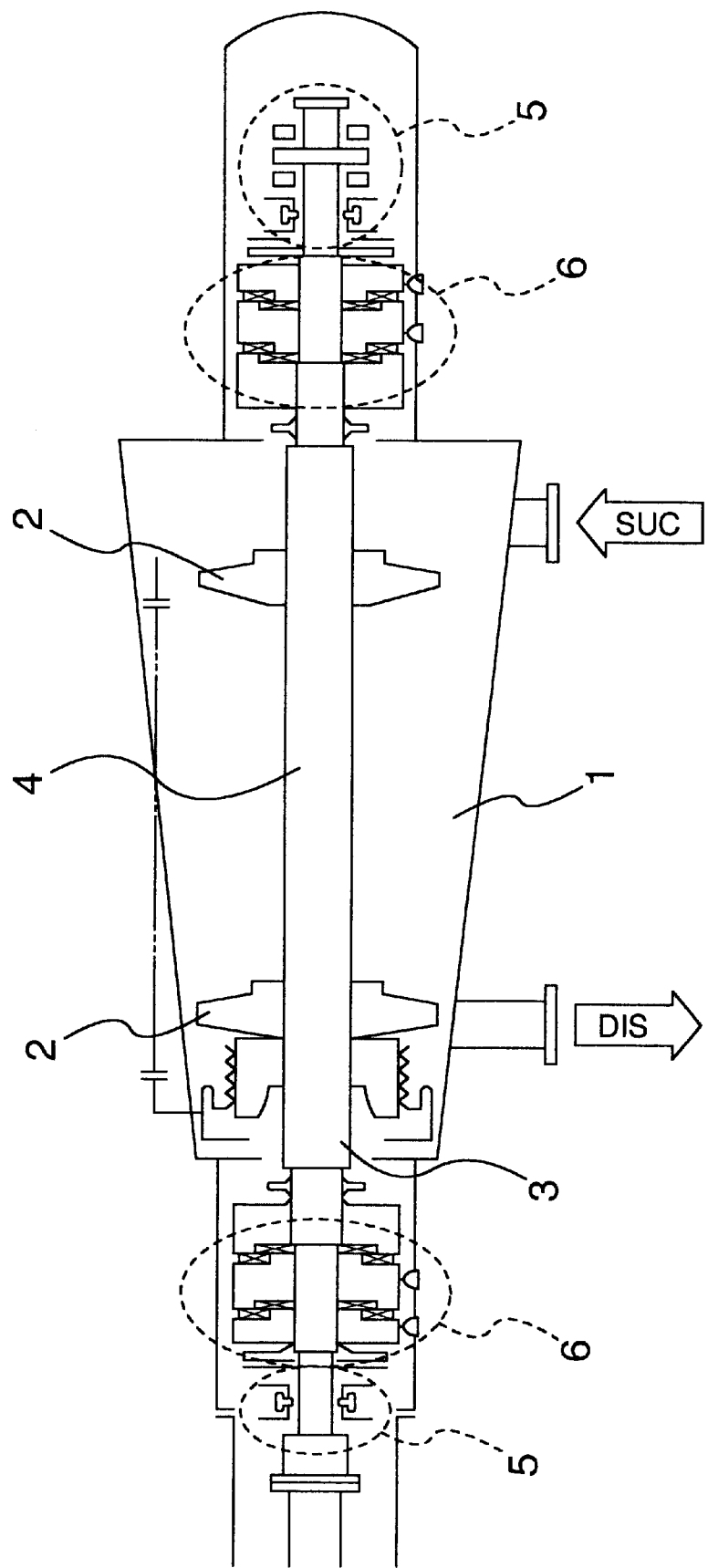
FIG. 1 is a schematic view showing an embodiment of a turbo type fluid machine in accordance with the present invention.

FIG. 1 is a schematic view showing a single-shaft multi-stage centrifugal compressor, which is one of turbo type fluid machines. With the single-shaft multi-stage centrifugal compressor, in which a chemical material such as ethylene gas or the like is treated, a plurality of centrifugal impellers 2 are mounted to a rotating shaft 3. A rotor 4 integrally composed of the rotating shaft 3 and the centrifugal impellers 2 is rotatably supported by bearing units 5 provided in two portions near shaft ends. Then, the rotor 4 and the bearing units are received in a casing 1. The bearing units comprise a radial bearing and a thrust bearing, and, as shown in FIG. 1, comprise a radial bearing on a left-hand shaft end, a thrust bearing on a right-hand shaft end and a radial bearing inwardly of the thrust bearing, respectively. Seal units 6 are provided inwardly of the respective bearing units 5 within the machine in order to prevent a working gas within the machine from flowing into the bearing units 5. Thus, the casing 1 is formed to cover both of the seal units 6 and the bearing units 5, thus preventing the working gas from leaking outside the machine. The working gas is sucked through a suction port (SUC), compressed with rotation of the rotor 4 to be reduced in volume, successively fed to a rear stage (left side in FIG. 1), and is fed to a consumption site from a discharge port as a discharge gas.

Figure 2:
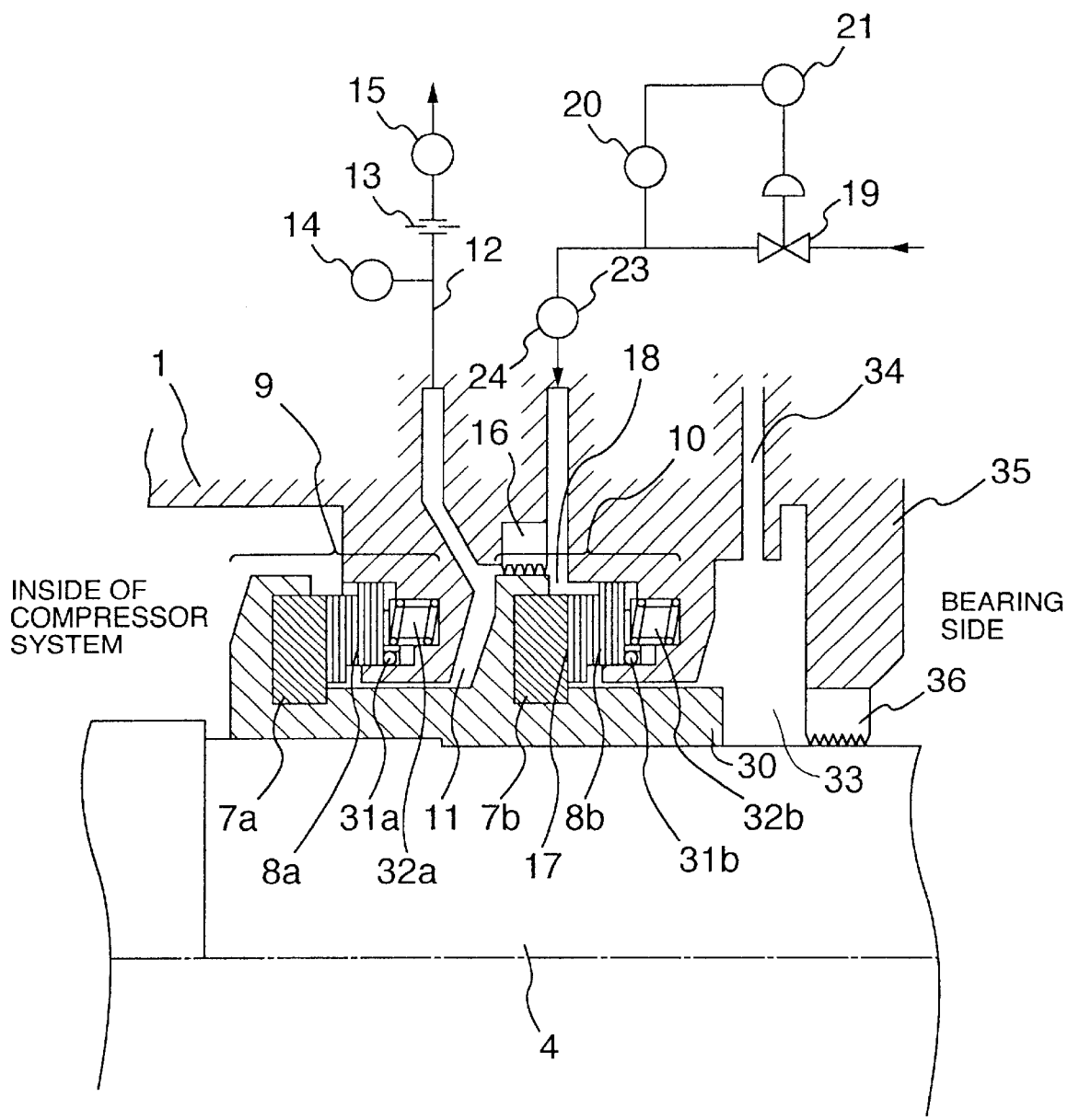
FIGS. 2 and 3 show in cross section details of a dry gas seal portion used in the turbo type fluid machine of the invention and also show a gas system.

FIG. 2 shows details of the seal units 6 in the single-shaft multi-stage centrifugal compressor. FIG. 2 is a vertical cross sectional view of the details of the seal units 6 shown in a right-hand side of FIG. 1, to which a seal gas system is schematically added. In the embodiment, a dry gas seal is used for sealing. The dry gas seal comprises a primary dry gas seal arranged inside of the compressor system and a secondary dry gas seal arranged on a side toward the bearing units 5 from the primary dry gas seal. Both the primary dry gas seal and the secondary dry gas seal are retained on a retainer member 30 mounted to the rotor 4, and comprise rotating rings 7a and 7b adapted to rotate together with the rotor 4, and stationary rings 8a and 8b, which form sealing surfaces between them and the rotating rings 7a and 7b. Springs 32a and 32b are arranged on back sides of the stationary rings 8a and 8b to control sealing between the stationary rings 8a and 8b and the rotating rings 7a and 7b. O-rings 31a and 31b are arranged on inner peripheral sides of the stationary rings 8a and 8b to prevent the working gas from leaking in an axial direction through gaps defined between the stationary rings 8a and 8b and the casing 1.

Further, a gap is defined between the inner peripheral portion of the casing 1 and the retainer member 30 so that the working gas leaking via sealing surface of the rotating ring 7a and the stationary ring 8a flows through the gap into a space 11 defined in the casing to be conducted outside the machine via the primary dry gas seal line 12, which is communicated with the space. In like manner, a gap is defined between the inner peripheral portion of the casing 1 and the retainer member 30 on a side of the secondary dry gas seal so that the working gas leaking via sealing surfaces of the rotating ring 7b and the stationary ring 8b and a part of a purge gas mentioned below pass via the gap outside the machine, and then are conducted via an external flow passage 34 from a chamber 33 defined between the secondary dry gas seal and a holder portion 35 for the bearing unit.

The working gas having leaked through the primary dry gas seal 9 is conducted to the primary dry gas seal vent line 12 from the space 11, and, in order to prevent the working gas from entering into the secondary dry gas seal 10 at that time, a labyrinth seal 16 is arranged between the retainer member and the casing 1 on a side of the secondary dry gas seal. The labyrinth seal 16 also prevents the casing 1 and the retainer member 30 from being brought into contact with each other on a side of the secondary dry gas seal. An orifice 13 is provided in the primary dry gas seal vent line 12 to measure a flow rate of the working gas flowing in the vent line. The gas detected by the orifice 13 is conducted into a flow meter 15. Meanwhile, pressure within the primary vent line 12 is conducted to a pressure switch 14. The leakage condition on the primary dry gas seal 9 is grasped on the basis of pressure within the primary dry gas seal vent line, monitored by the pressure switch 14 and the flow rate detected by the orifice 13, and when such values exceed predetermined values, an alarm or safety device is actuated.

A part of the working gas having leaked from the primary dry gas seal 9 passes through the labyrinth 16 to flow into a space 18 defined on a back side of the labyrinth 16. The space 18 is supplied with a purge gas composed of nitrogen and air from outside. Pressure of the purge gas is set to be somewhat higher than pressure of the working gas flowing in the primary dry gas seal vent line 12. The purge gas is supplied via a purge gas line 24, in which are provided a control valve 19 for controlling a quantity of the purge gas flowing through the purge gas line 24, a flow rate switch 23 provided between the control valve 19 and the space 18, and a pressure transmitter 20 for detecting the pressure of the purge gas in the purge gas line 24. A signal detected by the pressure transmitter 20 is input into a controller 21, which in turn feedback control an opening degree of the control valve 19 so that the pressure detected by the pressure transmitter 20 becomes constant. As a result, it is possible to control the pressure of the purge gas supplied to the space 18 to make the same constant.

Referring to FIG. 2, the flow rate switch 23 is provided upstream of the space 18. The flow rate switch 23 operates in the following manner. When the secondary gas seal 10 normally operates, a channel-resistance in the purge gas line 24 is constant, and a flow rate through the purge gas line 24 becomes constant. This is because the gap on the seal surface 17 between the rotating ring 7b and the stationary ring 8b and the gap between the labyrinth seal 16 and the retainer member 30 are stable. In contrast, when abnormality generates on the secondary dry gas seal 10, the gap on the seal surface 17 between the rotating ring 7b and the stationary ring 8b becomes unstable, and thus a quantity of the working gas leaking via the seal surface 17 increases. At this time, the pressure in the purge gas line 24 is controlled by the control valve 19 to be made constant, but a quantity of leakage via the seal surface 17 increases, so that a large quantity of the purge gas flows into the purge gas line 24 corresponding to the quantity of leakage. Therefore, a flow rate detected by the flow rate switch 23 increases, and abnormality on the secondary dry gas seal 10 is detected.

Figure 3:
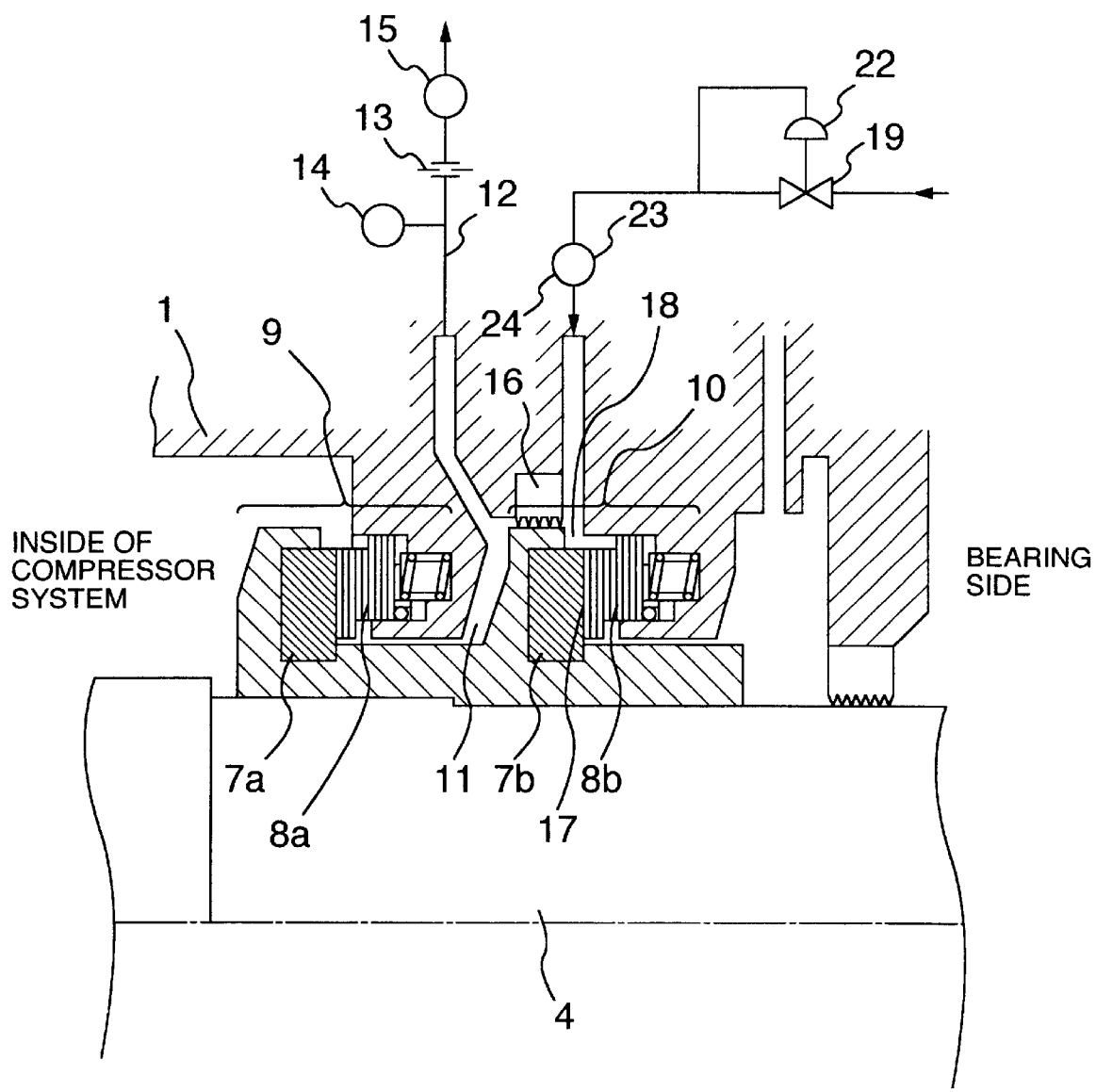

FIG. 3 shows an example, in which a self-operated valve 19b is used in place of the control valve 19 and the pressure transmitter 20 shown in FIG. 2. The self-operated valve 19b is provided with a diaphragm 22, and the pressure in the purge gas line 24 is directly input to the diaphragm 22. In this case, the pressure transmitter and the controller are dispensed with, and the construction structure becomes further simple.

As mentioned above, in accordance with the invention, it is made possible to detect abnormality on the secondary dry gas seal, which cannot be conventionally detected during the normal operation, in the turbo type fluid machine. Besides, since the flow rate switch detects a subtle change in an amount of leakage of the secondary dry gas seal, it is possible to detect such change in the same level as that for the primary dry gas seal. Further, with the turbo type fluid machine of the invention, what is needed is only the purge gas pipe leading to the secondary dry gas seal, the control valve, the flow rate switch and so on, so that it is possible to detect abnormality on the secondary dry gas seal at low cost. Further, the invention can be simply applied to existing dry gas seal systems, in which the secondary dry gas seal abnormality detecting system is not provide.

What is claimed is:

1. A turbo type fluid machine provided with a sealing device composed of a primary dry gas seal for preventing a working gas from leaking outside the machine and a secondary dry gas seal for preventing a working gas, which leaks from the primary dry gas seal, from leaking outside the machine, and a flow rate switch for detecting presence of an abnormality on the secondary dry gas seal by detecting a quantity of the working gas leaking from the secondary dry gas seal.

2. A dry gas seal device for sealing a working gas compressed in a turbo type fluid machine, comprising a primary dry gas seal for preventing a working gas from leaking outside the machine and a secondary dry gas seal for preventing a working gas, which leaks from the primary dry gas seal, said secondary dry gas seal including abnormality detecting means for detecting abnormality in accordance with an amount of the working gas leaking from said first dry gas seal, wherein said abnormally detecting means comprises purge gas supply means for supplying the purge gas to said secondary dry gas seal, pressure control means for controlling pressure in the purge gas Supply means, and a flow rate switch for detecting abnormality in flow rate within said purge gas supply means.

3. A turbo type fluid machine provided with a rotor, bearings, which rotatably support the rotor and are arranged in the vicinity of both ends of the rotor, a casing, which receives therein said rotor and said bearings, and two sealing devices arranged inwardly of said bearings in an axial direction of the rotor, said sealing devices comprising a first rotating ring and a second rotating ring, which are fixed to said rotor, a first stationary ring opposed to the first rotating ring and fixed to said casing, a second stationary ring opposed to the second rotating rind and fixed to said casing, and a purge gas supply line, through which a purge gas is fed to opposing portions of said second rotating ring and said second stationary ring, the first rotating ring and the first stationary ring constituting a primary dry gas seal for preventing a working gas from leaking outside the machine, the second rotating rind and the second stationary ring constituting a secondary dry gas seal for preventing a working gas, which leaks from the primary dry gas seal, from leaking outside the machine, said purge gas supply line being provided with abnormal flow-rate detecting means.

4. The turbo type fluid machine as claimed in claim 3, wherein said abnormal flow-rate detecting means is a flow rate switch.

5. The turbo type fluid machine as claimed in claim 4, further comprising control means provided in said purge gas supply line for controlling pressure of a gas flowing in said purge gas supply line.

6. The turbo type fluid machine as claimed in claim 5, wherein said pressure control means includes a control valve and a pressure transmitter provided downstream of the control valve.

7. The turbo type fluid machine as claimed in claim 6, wherein said pressure control means includes a control valve with a diaphragm.

8. The turbo type fluid machine as claimed in claim 3, further comprising a primary seal vent line provided on back sides of said first rotating ring and said first stationary ring for conducting a gas, which leaks from the first rotating ring and the first stationary ring, to outside the machine.

9. The turbo type fluid machine as claimed in claim 8, further comprising an orifice, a pressure switch and a flow rate meter, which are provided in said primary seal vent line.

* * * * *